United States Patent [19]
Takahashi et al.

[11] Patent Number: 5,520,047
[45] Date of Patent: May 28, 1996

[54] EXOTHERMIC RESISTOR ELEMENT AND THERMAL PROCESS AIR FLOW METER USING THE SAME

[75] Inventors: Minoru Takahashi, Mito; Kaoru Uchiyama, Oomiya-machi; Yutaka Nishimura, Katsuta; Isao Nunokawa, Hitachi, all of Japan

[73] Assignee: Hitachi, Ltd., Japan

[21] Appl. No.: 209,205

[22] Filed: Mar. 4, 1994

[30] Foreign Application Priority Data

Mar. 17, 1993 [JP] Japan .................................. 5-056751

[51] Int. Cl.⁶ ........................................................... G01F 1/68
[52] U.S. Cl. ................................... 73/204.26; 73/170.12
[58] Field of Search .......................... 73/204.26, 204.23, 73/170.12, 204.21

[56] References Cited

U.S. PATENT DOCUMENTS

| | | | |
|---|---|---|---|
| 3,490,283 | 1/1970 | Vidal et al. | |
| 3,995,481 | 12/1976 | Djorup | 73/204.26 |
| 4,320,655 | 3/1982 | Kammermaier et al. | 73/204.26 |
| 4,691,566 | 9/1987 | Aine | 73/204.26 |
| 4,829,814 | 5/1989 | Suzuki et al. | 73/204.26 |
| 4,920,793 | 5/1990 | Djorup | |
| 4,936,144 | 6/1990 | Djorup | 73/204.21 |
| 5,024,083 | 6/1991 | Inada et al. | 73/204.26 |
| 5,086,650 | 2/1992 | Harrington et al. | 73/204.21 |
| 5,140,854 | 8/1992 | Sakaue et al. | 73/204.26 |
| 5,271,272 | 12/1993 | Hueftle et al. | 73/204.26 |

FOREIGN PATENT DOCUMENTS 63-265118 9/1988 Japan.
1-185416 5/1989 Japan.

OTHER PUBLICATIONS

English translation of Office Action from foreign patent office in corresponding foreign application.

Primary Examiner—Richard Chilcot
Assistant Examiner—Harshad Patel
Attorney, Agent, or Firm—Evenson, McKeown, Edwards & Lenahan

[57] ABSTRACT

In the thermal process air flow meter according to the invention first, second and third electrode terminals are arranged on the same surface at one end of a substrate. A first exothermic resistor is connected between the first and second terminals, and a second exothermic resistor is connected between the second and third terminals, with the first exothermic resistor on a front surface of a substrate and the second exothermic resistor on the opposite (back) surface. The substrate may also carry the semiconductor elements of an electronic circuit used to analyze electric signals from the terminals. In a preferred embodiment of the invention, the substrate is mounted at an incline relative to the direction of unobstructed air flow in the air passage.

11 Claims, 5 Drawing Sheets

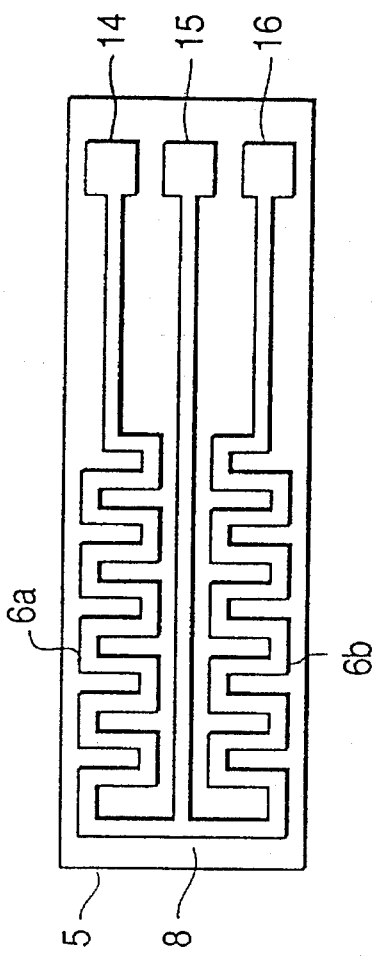
FIG. 1
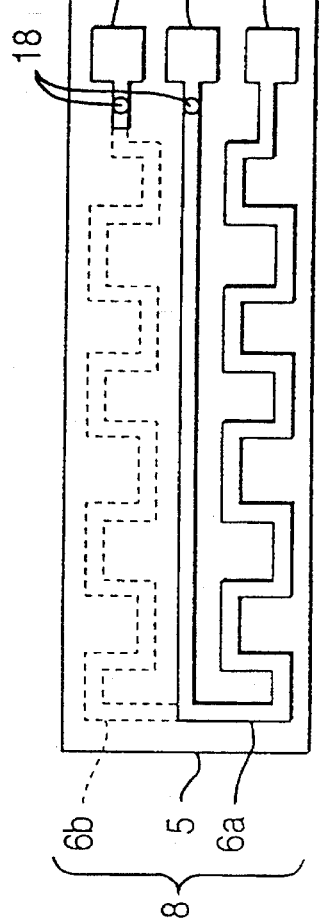
FIG. 2(a)
FIG. 2(b)

EXOTHERMIC RESISTOR ELEMENT AND THERMAL PROCESS AIR FLOW METER USING THE SAME

BACKGROUND OF THE INVENTION

This invention relates to exothermic resistor elements, and to a thermal process air flow meter of the type used to measure forward and backward air flows in internal combustion engines, and the like.

Thermal process flow meters are frequently used for electronically controlled fuel injection systems for internal combustion engines, because of their advantages such as compact size, quick response, etc. Such air flow meters are disclosed, for example, in Japanese Patent Applications Laid-Open No. 265118/1988 and No. 185416/1989, as well as in U.S. Pat. No. 5,086,650.

In conventional exothermic resistor elements, electrode terminals are provided on both the right and left ends, with the number of terminals being four in some cases and three in others. When three electrode terminals are provided, they are arranged on opposite walls of a suction passageway, which complicates the connection of the exothermic resistor element to the electric circuit. Those elements also occupy excessive space for mounting.

In addition, in conventional thermal process air flow meters, if both the first and second exothermic resistors are arranged parallel to the direction of air flow, on the same surface of a substrate, the difference in their respective heat transmission is small. When they are inclined relative to each other, the difference in the heat transmission is less affected by turbulence, but it is impossible to generate a significant difference between the amount of radiated heat. As a result, the heat response is slowed when the air flow reverses, which makes it difficult to detect the direction of air flow accurately. This problem has remained unsolved heretofore.

U.S. Pat. No. 5,086,650 discloses an air flow detector in which the substrate is inclined relative to the air flow direction, and bi-directional measurement is achieved by placing a first exothermic air flow detector to measure air flow in a forward direction on one side of the substrate, and a second (identical) exothermic air flow detector to measure reverse air flow on the other side. Each of the respective detectors has a heater element situated adjacent to heat detectors, and air flow is measured by pulsing the heater and measuring the phase shift in the output signal of a downstream detector. This arrangement achieves bidirectional air flow detection but requires a complex configuration of heater and sensors as well as complex circuitry.

SUMMARY OF THE INVENTION

One object of the present invention, is to provide a thermal process air flow meter that generates a significant difference between the radiated heat from the exothermic resistance elements,.is simplified for easier connection to the electric circuit, and can accurately detect and measure the direction of air flow.

This and other objects and advantages are achieved by the exothermic resistor element according to the invention in which first, second and third electrode terminals are arranged on the same surface at one end of a substrate, which may be made for example from aluminum oxide. A first exothermic resistor is connected between the first and second terminals, and a second exothermic resistor is connected between the said second and third terminals, with the first exothermic resistor on a front surface of the substrate and the second exothermic resistor on the opposite (back) surface. Holes through the substrate are provided between the second and third terminals and the respective ends of the second exothermic resistor, for the purpose of electrical connection.

The substrate may also carry the semiconductor elements of an electronic circuit used to analyze electric signals from the terminals. The semiconductor elements may be in the form of an integrated circuit incorporated into a semiconductor chip.

In a preferred embodiment of the air flow meter according to the invention, a substrate with exothermic resistors on opposite sides thereof is mounted at an incline relative to the direction of unobstructed air flow in the air passage. In this manner, an air flow is channeled over the resistor on one side, and the resistor on the other side is effectively shielded from the air flow, depending on the direction of air movement. (The first and second resistors may also be mounted on separate substrates which are inclined in this manner.) Thus, when the air flow direction changes, a significant difference exists between the heat transmission of the first and second resistors due to differences in the thickness of the temperature boundary layers at their respective surfaces. As a result, a difference can be detected between the heat radiated by the first and second resistors, and it is possible to improve the response time when the air flow is reversed, so that the air flow direction can be detected and measured accurately.

With the configuration mentioned above, both the number of connections on the terminals and size of the substrate can be reduced. Also, the substrate can be connected directly to the electric circuit at one end, which simplifies the overall structure and provides for easier connection of the exothermic resistors.

Other objects, advantages and novel features of the present invention will become apparent from the following detailed description of the invention when considered in conjunction with the accompanying drawings.

BRIEF DESCRIPTION OF THE DRAWINGS

FIG. 1 shows a first embodiment of the exothermic resistor element according to the invention;

FIG. 2(a) is a plan view of an exothermic resistor element of a second embodiment of the invention;

FIG. 2(b) is a side view of the exothermic resistor element of FIG. 2(a);

DETAILED DESCRIPTION OF THE DRAWINGS

Figure 3A:
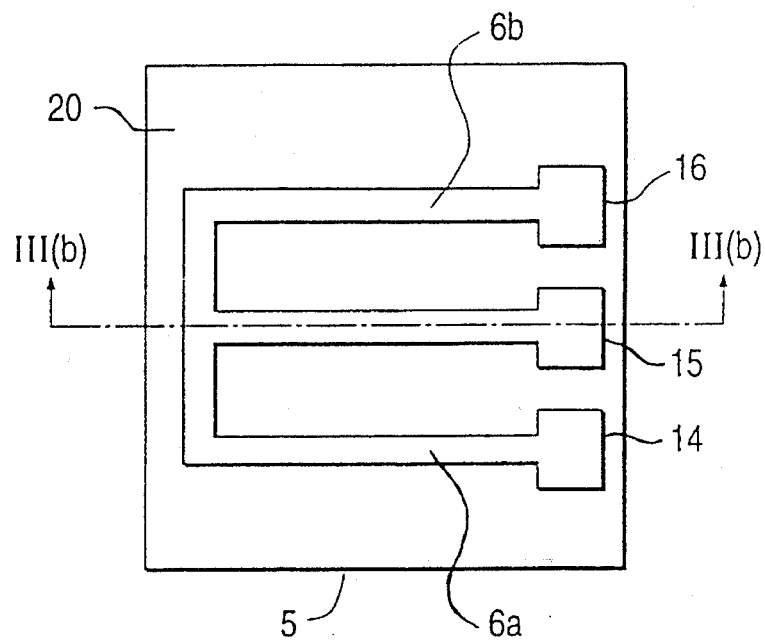
FIG. 3(a) is a plan view of the exothermic resistor element in a third embodiment of the invention.

FIG. 1 shows a first embodiment of the exothermic resistor element according to the invention, which has first, second and third terminals 14, 15, and 16. A first exothermic resistor 6a is connected between the first and second terminals 14 and 15, and a second exothermic resistor 6b is connected between the second and third terminals 15 and 16. The terminals 14, 15, 16 and the exothermic resistors 6a and 6b are formed of platinum or nickel film on the substrate 5, which is made of an electrically insulating material. The terminal 15 is common to both of the exothermic resistors 6a and 6b. The first, second and third terminals 14, 15 and 16 are arranged at one end of the substrate on the same surface.

FIG. 2(a) shows a plan view of another embodiment of the exothermic resistor element according to the invention, while FIG. 2(b) shows a side view. In this embodiment, each of the terminals 15, 16 has first and second parts arranged on front and back surfaces of the substrate. The first exothermic resistor 6a is provided on the front surface of the substrate 5, and the second exothermic resistor 6b is provided on the back surface. The first terminal 14 and a first part 15a of the second electrode terminal are provided on the front surface, and the first exothermic resistor 6a is connected between them. Second parts of the second and third terminals 15b and 16b are provided on the back surface of the substrate, and the second exothermic resistor 6b is connected between them. In addition, a plated passageway or hole 18 is provided through the substrate 5 as a means of electrically connecting the first and second parts 15a and 15b of the second terminal, and the first and second parts 16a and 16b of the third terminal.

Figure 3B:
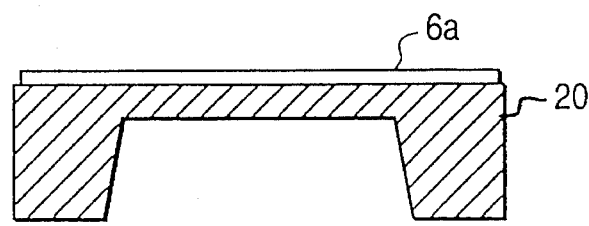
FIG. 3(b) is a cross sectional side view of the exothermic resistor of FIG. 3 (a), taken along line III(b)–III (b) of FIG. 3 (a)

FIG. 3 shows another embodiment of the exothermic resistor element according to the invention. FIG. 3(a) shows a plan view and FIG. 3(b) shows a cross-section taken along the line III(b)–III(b) in FIG. 3(a). The first and second exothermic resistors 6a and 6b are formed on the surface of a semiconductor element 20 and are made, for example, in the form of film resistors. They are coupled to terminals 14, 15 and 16, with the terminal 15 being common to both.

Figure 4:
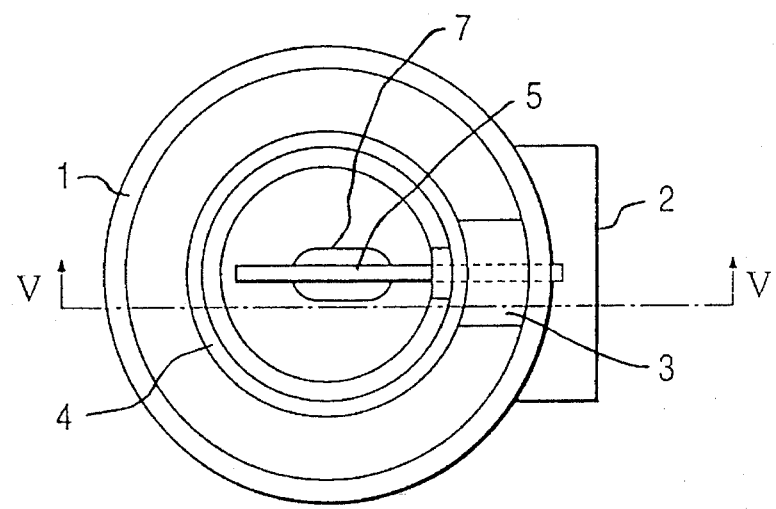
FIG. 4 is a plan view of the mounting structure according to the invention.
Figure 5:
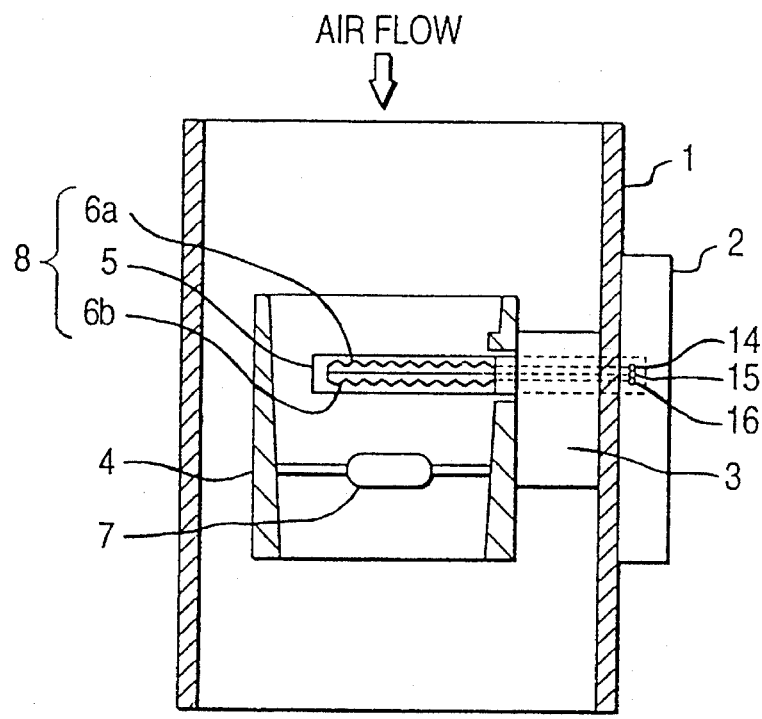
FIG. 5 is a partial horizontal cross sectional view of the mounting structure of FIG. 4, taken along line V—V of FIG. 4.

FIGS. 4 and 5 show an embodiment of a thermal process air flow meter in which the exothermic resistor element according to the invention is mounted. FIG. 4 shows a plan view, and FIG. 5 shows a horizontal cross-section taken along line V—V of FIG. 4.

An electric circuit 2 is provided on the outer periphery of the external passageway 1. An inner passageway 4 is mounted inside the external passageway 1 by means of the fixture member 3. The substrate 5, the first and second exothermic resistors 6a and 6b provided thereon, the exothermic resistor circuit 8 having the first, second, and third terminals, and a temperature compensation resistor 7 (which detects the temperature of intake air; see FIG. 6) are all arranged in the inner passageway 4. The exothermic resistor element 8 is connected directly to the electric circuit through the fixture member 3.

Figure 6:
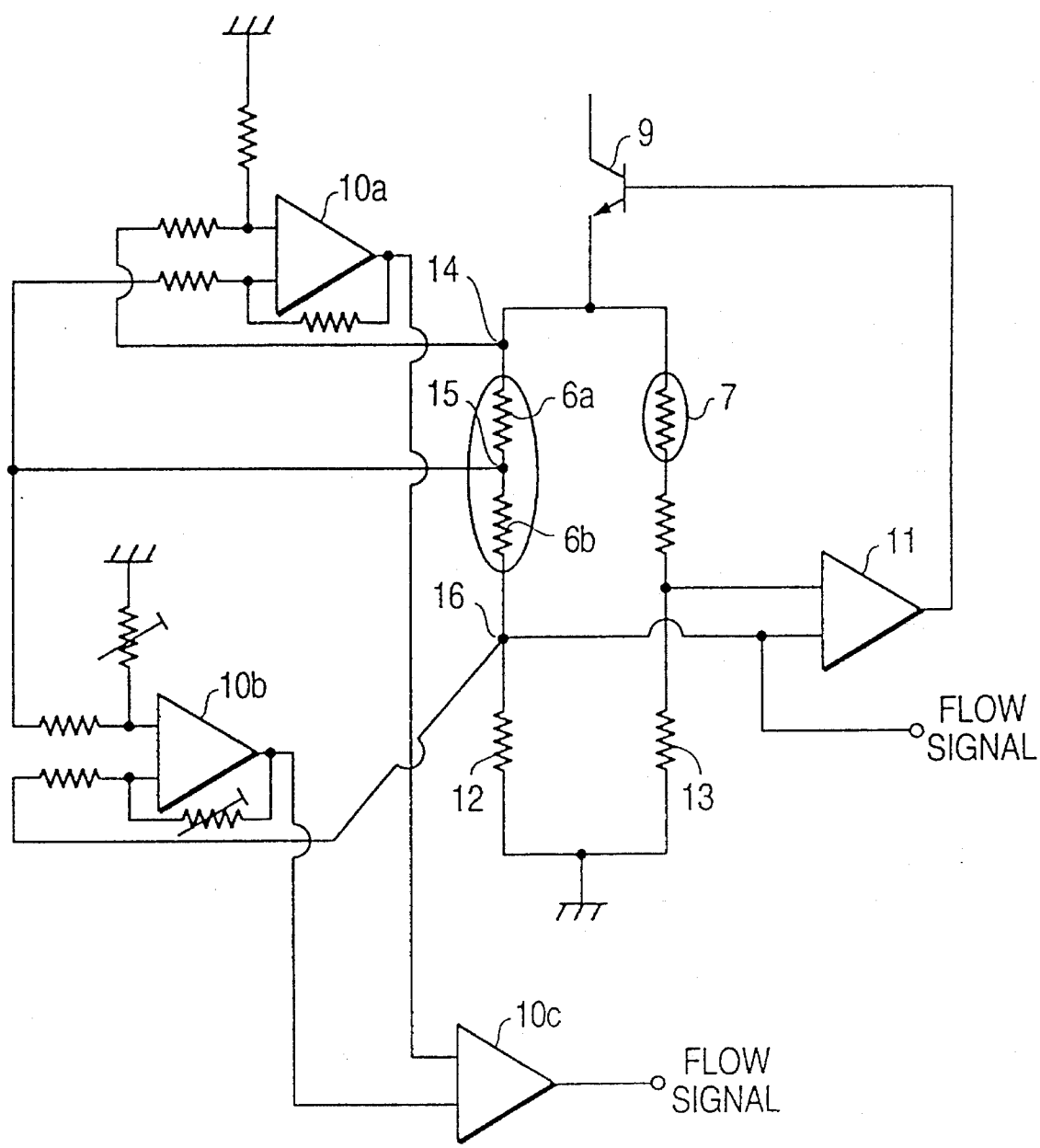
FIG. 6 shows part of the electric circuit used in the invention.

FIG. 6 shows a detection circuit, which is part of the electric circuit 2 in FIG. 5. This circuit comprises a bridge circuit having a feedback amplifier 11, a transistor 9, first and second exothermic resistors 6a and 6b, a temperature compensation resistor 7, and fixed resistors 12 and 13. The bridge circuit itself is configured as a conventional hot wire detector, which measures the quantity of air flow in a known manner. A flow direction detection circuit comprising differential amplifiers 10a, b and comparator 10c detects the difference between the output signals of terminals 15 and 16 on the one hand, and terminals 15 and 14 on the other, (representing the amount of radiated heat from the first and second exothermic resistors 6a and 6b), to judge the direction of air flow. That is, in the case of forward air flow, the amount of heat dissipated by the resistor 6a is increased while that of resistor 6b is not. Hence, the voltage drop $V_{R6a}$ is smaller than $V_{R6b}$, and the comparator 10c outputs a logical 1 signal. For reverse air flow, the situation is the opposite, and comparator 10c outputs a logical 0 signal. The quantity of air flow is measured by the voltage at node 16 in a conventional manner, as noted previously. (Flow signal should be zero flow and not be used.)

As explained above, the three terminals 14 through 16, are disposed at one end of the substrate. This arrangement is effective to achieve the following improvements for transmitting the electric signals from the exothermic resistor element 8 to the electric circuit 2.

(i) The substrate size can be reduced, with the number of electrode terminals reduced to three;
(ii) The electrode terminals can be connected to the electric circuit with only three wires;
(iii) The wiring space required for such connection is reduced; and
(iv) The electrode terminals are connected to the electric circuit in the shortest distance.

These advantages collectively provide a simpler structure for the substrate, and facilitate easier mounting of the components thereon.

Figure 7A:
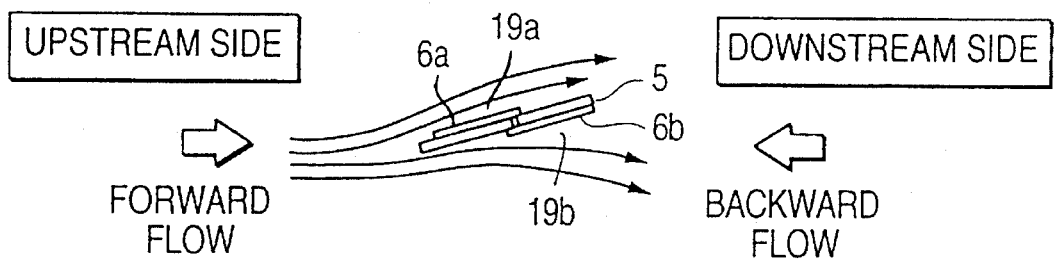
FIGS. 7a and 7b are partial enlargements of additional embodiments of the exothermic resistor element according to the invention.

FIG. 7a illustrates the flow of air around an exothermic resistor circuit 8 according to the invention, which is mounted in the inner passageway 4 of the thermal process air flow meter. In this embodiment, which incorporates the exothermic resistor element 8 shown in FIG. 2 (with resistors 6a, 6b on opposite sides of the substrate), the substrate 5 is inclined at an angle relative to a horizontal flow of air inside the passageway 4. With this arrangement, a forward air flow (left to right in the figure) is channeled over the exothermic resistor 6a by the substrate itself, which effectively blocks the flow of air in the immediate vicinity of the surface of the exothermic resistor 6b. When the flow reverses on the other hand, air is channeled over the resistor 6b, while resistor 6a is effectively shielded from the reverse air flow. In other words, the air flows on the surface of the first exothermic resistor 6a but is diverted from the surface of the second exothermic resistor 6b, in the forward flow, and vice versa.

Usually, the air flow in the inner passageway 4 is laminar, and it is well known that the heat transmission of a flat plate placed in such a uniform laminar air flow is closely related to the thickness of the temperature boundary layer on the plate surface. Thus, the temperature boundary layer 19a on the surface of the first exothermic resistor 6a becomes thinner than the temperature boundary layer 19b of the second exothermic resistor 6b because of the difference in the amount of local air turbulence. Therefore, heat transmission differs significantly between the first and second exothermic resistors 6a and 6b.

Figure 7B:
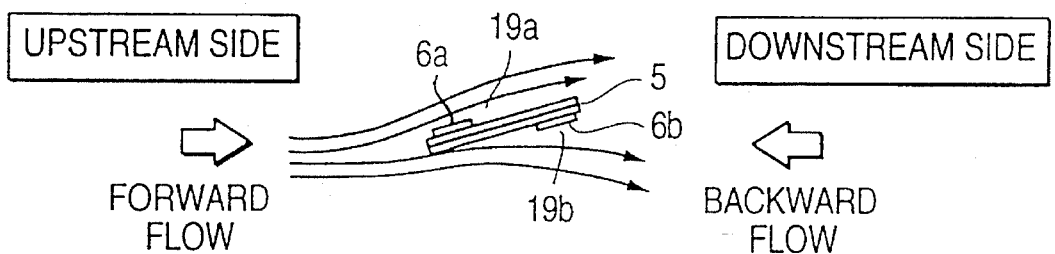

As noted previously, the respective exothermic resistors 6a, 6b may also be mounted on separate substrates. See FIG. 7b.

Figure 8B:
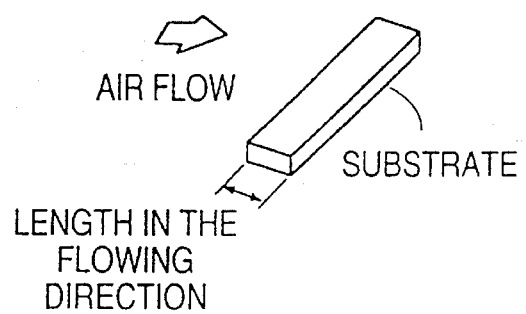
FIGS. 8a and b contain a graphic depiction of the calculation results for heat transmission on a flat plate in a uniform air flow.
Figure 8A:
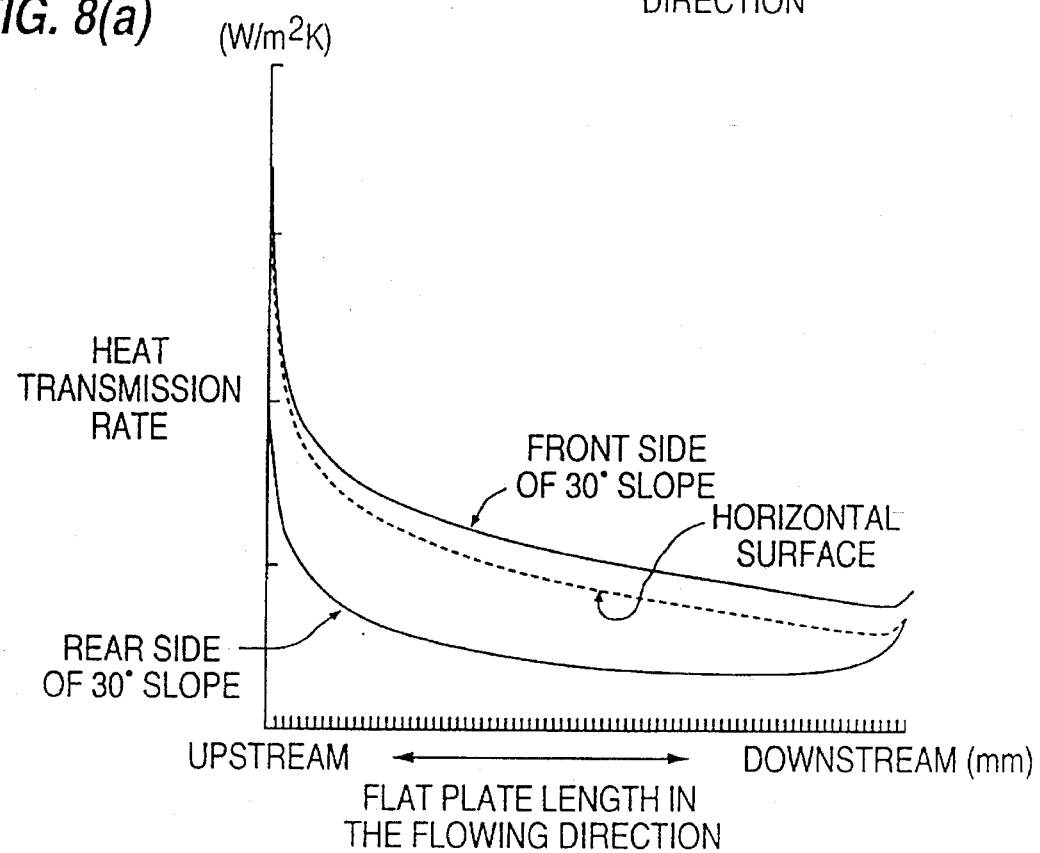

FIG. 8 is a graphic illustration of the heat transmission of the flat plate in a uniform flow of air. The surface length along the air flow direction of the flat plate is displayed on the horizontal axis, while the heat transmission at a given point on the surface is shown on the vertical axis. The solid lines represent the heat transmission rate on the front and rear sides of the slope when the flat plate is inclined by 30° against the air flow. The broken line indicates the curve of the heat transmission rate when the flat plate is mounted horizontally. In the latter case, there is only a single curve, since there is no difference in the heat transmission between the front and rear sides of the plate. When the plate is inclined as shown in FIG. 7a, however, two curves appear, indicating a significant difference in the heat transmission rate between the front and rear sides of the inclined plate.

In this embodiment, therefore, the amount of radiated heat output by the first and second exothermic resistors mounted on the front and back surfaces can be easily detected, so quick heat responses can be expected when the air flow is reversed. Thus, the backward flow signal can be determined earlier. In addition, forward and backward flows can be distinguished clearly and the distinction is less affected by turbulence and disturbances, even when they occur. As a result, an erroneous backward air flow signal is prevented, so that the reverse air flow can be detected and measured accurately.

Figure 9:
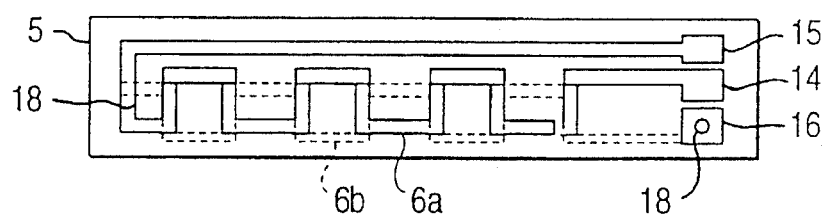
FIG. 9 is a plan view of the exothermic resistor element in another embodiment of this invention.

In the embodiment shown in FIG. 9, the exothermic resistors 6a and 6b are arranged directly opposite each other on the front and back surfaces of the substrate. The difference in heat transmission rate between the front and rear sides of the flat plate in this case can also be detected in the manner described above. Thus, the purpose of this invention can be achieved. The width of the substrate can also be reduced by approximately a half, compared to that in the embodiment shown in FIG. 7a.

Since this invention allows the number of connections in the electrode terminals (and the substrate size) to be reduced, the exothermic resistor element structure can be simplified for easier connection of the exothermic resistor element to the electric circuit. On the other hand, the amount of heat radiated from the first and second exothermic resistors can be distinguished clearly, providing a thermal process air flow meter having a high precision backward flow detecting function.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Bidirectional air flow detector comprising:

a substrate arranged in an air flow path and inclined at an angle relative to air flow in said air flow path;

a first exothermic resistor arranged on a first surface of said substrate, said first exothermic resistor outputting a signal indicative of heat dissipated thereby;

a second exothermic resistor arranged on a second surface of said substrate opposite said first surface, said second exothermic resistor outputting a signal indicative of heat dissipated thereby, said first and second exothermic resistors being electrically connected to each other in series;

an air flow detection circuit for detecting air flow, said air flow detection circuit comprising a bridge circuit having said electrically connected first and second exothermic resistors forming a first arm of said bridge circuit between adjacent bridge points, and at least one additional resistor forming a second arm of said bridge circuit;

a flow detection circuit for comparing said output signals of said first and second exothermic resistors and for outputting a direction signal based on relative magnitude thereof.

2. Bidirectional air flow detector according to claim 1 wherein said flow direction circuit comprises:

a first sensor for sensing a voltage across said first exothermic resistor;

a second sensor for sensing a voltage across said second exothermic resistor; and a comparator coupled to receive output signals from said first and second sensors.

3. Bidirectional air flow detector according to claim 2 wherein said first and second sensors comprise first and second differential amplifiers connected in parallel to said first and second exothermic resistors, respectively.

4. Bidirectional air flow detector according to claim 3, wherein said flow detection circuit comprises:

a feedback amplifier connected diagonally in said bridge circuit; and a switch element with controls current flowing in said bridge circuit in response to an output of said feedback amplifier.

5. An air flow detector arrangement comprising:

a substrate;

an air flow detector having a first heat sensitive detector element, a second heat sensitive detector element and a circuit for determining an amount and direction of air flow based on outputs from both of said first and second heat sensitive detector elements, said first and second heat sensitive detector elements being mounted on opposite sides of said substrate;

a plurality of electrodes arranged on one of said first and second surfaces at an end of said substrate, whereby one of said first and second heat sensitive detector elements is arranged on the surface of said substrate on which said plurality of electrodes is arranged, and the other of said first and second heat sensitive detector elements is arranged on the surface of said substrate opposite that on which the plurality of electrodes is arranged;

wherein said first heat sensitive detector element is connected between a first pair of said electrodes, and said second heat sensitive detector element is connected between a second pair of said electrodes, the one of said first and second heat sensitive detector elements which is arranged on the surface opposite the surface on which the plurality of electrodes is arranged being electrically connected to at least one of the electrodes through a plated hole in said substrate between said first and second surfaces, and one electrode of said second pair being the same as an electrode of said first pair.

6. Apparatus according to claim 5 wherein said first and second heat sensitive detector elements are aligned in registration on opposite surfaces of said substrate.

7. Apparatus according to claim 5 when said first and second heat sensitive detector elements are film type exothermic resistors.

8. Apparatus according to claim 5 further comprising:

a switch arrangement for controlling a flow of current through said first and second heat sensitive detector elements;

means for measuring electric current flow through said first and second heat sensitive detector elements;

means for detecting a first voltage across said first heat sensitive detector element;

means for detecting a second voltage across said second heat sensitive detector element; and a comparator coupled to receive and compare said first and second voltages.

9. Air flow detector arrangement according to claim 5 wherein said first and second heat sensitive detector elements comprise first and second exothermic resistors, respectively.

10. Apparatus according to claim 9 wherein said first and second exothermic resistors are arranged on opposite surfaces of a substrate which is disposed in said air flow path and inclined at an angle relative to air flow therein.

11. Apparatus according to claim 9 wherein said first and second exothermic resistors are aligned in registration with each other on said opposite surfaces.

* * * * *